Jan. 11, 1949.          A. L. PARKER                2,458,874
                      COUPLING FOR TUBES
                      Filed Dec. 28, 1944
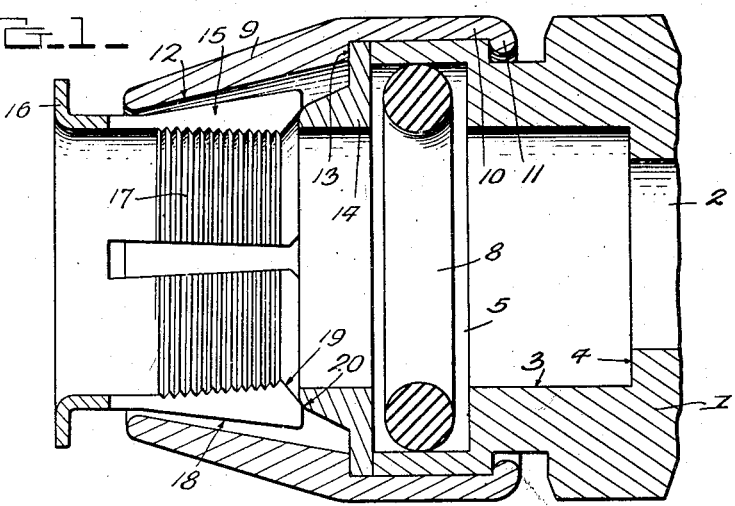
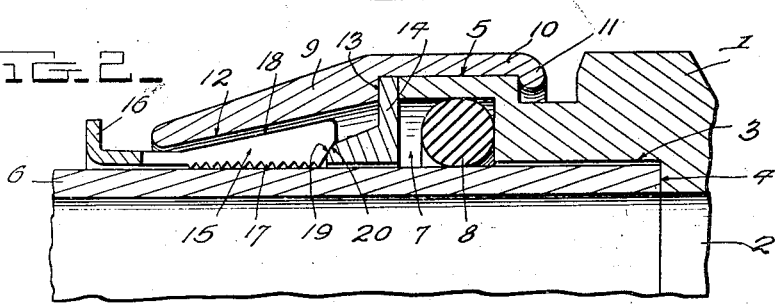
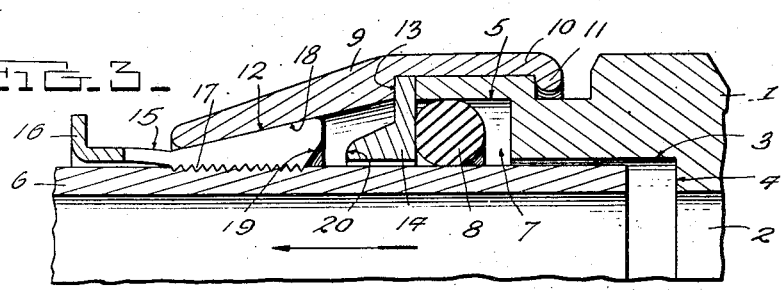
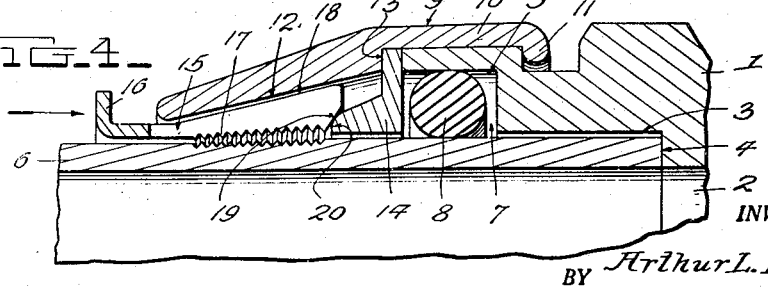
INVENTOR.
BY *Arthur L. Parker.*

Patented Jan. 11, 1949

2,458,874

UNITED STATES PATENT OFFICE 2,458,874

COUPLING FOR TUBES

Arthur L. Parker, Cleveland, Ohio, assignor to The Parker Appliance Company, Cleveland, Ohio, a corporation of Ohio Application December 28, 1944, Serial No. 570,158

6 Claims. (Cl. 285—168)

The invention relates to new and useful improvements in a coupling for tubes and more particularly to a coupling for a flareless tube.

An object of the invention is to provide a coupling which is so constructed that a tube may be inserted in the coupling when the parts are assembled and gripped and sealed to the coupling so that it cannot be removed therefrom by a pull on the tube.

A further object of the invention is to provide a coupling of the above type with means whereby the grip of the coupling on the tube may be released when it is desired to remove the tube from the coupling.

These and other objects will in part be obvious and will in part be hereinafter more fully disclosed.

In the drawings which show by way of illustration one embodiment of the invention:

Figure 1 is a longitudinal sectional view through a coupling embodying the improvements with the parts assembled before a tube is inserted therein;

Figure 2 is a view similar to Figure 1 but showing the tube as inserted in the coupling;

Figure 3 is a view showing the tube firmly gripped and held in the coupling by a slight outward pull on the tube.

Figure 4 is a view similar to Figure 3 but showing the gripping device within the coupling released from the tube so that it can be removed.

In the present embodiment of the invention the coupling includes a body member 1 having a bore 2 therethrough. Said body member is counterbored as indicated at 3 to provide a shoulder 4 which operates as a seat for the end of the tube. Said body member is provided with another counter-bore at its outer end as indicated at 5. This counter-bore 5, together with the tube which is indicated at 6, forms a chamber 7 for a deformable ring gasket 8. The ring gasket is initially circular in cross section and is dimensioned relative to the outer diameter of the tube and the diameter of the bore 5 so that when the ring is placed on the tube and inserted in the chamber 7, said ring will be deformed so that the tendency of the ring to expand radially of the tube and coupling will cause the gasket to make a tight sealing contact with the body member and with the tube.

Attached to the body member is a nut 9 which nut is provided with an inner portion 10 which conforms to the outer face of the body member and the inner end of this nut, as shown in the drawings, is spun inwardly as indicated at 11 so as to firmly secure the nut to the body member 1.

The inner face 12 of the nut is shown as tapered inwardly toward the outer end of the nut. Said taper extends to a shoulder 13 formed in the nut. A camming ring 14 surrounds the tube and has an outwardly extending flange which is gripped between the end of the body member 1 and the shoulder 13. The camming ring, the nut and the body member form a rigid unit when the nut is attached to the body member. Instead of spinning the inner end of the nut onto the body member as described above, the nut may have a threaded connection with the body member or be attached thereto in any suitable way. After the parts are assembled in the manner described, they are not disconnected when it is desired to connect the tube to the coupling or remove the tube from the coupling.

The wall 12 of the nut is spaced away from the tube. This provides a recess in which a sleeve 15 is located. This sleeve projects outwardly beyond the end of the nut and has an outwardly turned flange 16 at the end thereof. The sleeve is formed with slots at spaced intervals so that the inner portion of the sleeve may be radially contracted. The inner face of the sleeve at the inner end thereof is provided with a series of serrations 17. The outer face of this sleeve is tapered as indicated at 18. The inner end of the sleeve 15 is inclined to the wall of the tube as indicated at 19, and this inclined end is adapted to engage the rounded cam face 20 of the camming ring 14 when the sleeve is pushed inwardly into the coupling.

When the parts are assembled as shown in Figure 1 the sleeve 15 becomes a unit with the coupling. The inner end portion of the sleeve is so dimensioned that the serrations normally extend inwardly so that when a tube is inserted in the sleeve and the coupling it will engage the serrations and expand the inner end of the sleeve so as to permit the tube to pass into the coupling and the end thereof to engage the seat 4. In Figure 2 the tube is shown as inserted in the coupling. When the tube is inserted in the coupling the ring gasket is deformed so that a tight seal is formed between the coupling and the tube. An outward pull on the tube, as indicated in Figure 3, will cause the sleeve to move with the tube due to the serrations making gripping contact with the tube. This will bring the outer tapered face 18 of the sleeve into contact with the inner tapered face 12 of the nut. Continued outward pull on the tube will force the serrations into the tube so that they become embedded therein and this will hold the tube so that it cannot be pulled from the coupling. It will be noted from the above that all that is necessary after the coupling parts are assembled is to insert the tube in the coupling and give a slight pull on the tube and it will be firmly locked to the coupling and also sealed in the coupling.

When it is desired to remove the tube from the coupling it is not necessary to disassemble the parts of the coupling. The operator will drive the sleeve 15 inwardly. The inclined end 19 thereof will engage the cam 20 of the camming ring 14 and expand the end of the sleeve outwardly so as to disconnect the serrated portion of the sleeve from the tube. This will permit the tube to be withdrawn from the coupling. The camming ring 14 closes the chamber 7 in which the gasket 8 is located. This camming ring is rigidly held by the coupling members. Any fluid leaking into the chamber 7 and bearing against the gasket will force the gasket against the camming ring 14, as shown in Figure 3, and the fluid pressure tending to contract the gasket in a direction parallel with the tube will expand it against the body member and the tube and increase the tightness of the seal.

It will be understood that many changes in the details of construction may be made without departing from the spirit of the invention as set forth in the appended claims.

I claim:

1. A coupling for tubes comprising a body member having a bore to receive the tube end, a nut directly connected to said body member, said body member having a counter-bore forming with the tube an annular chamber for a gasket, a deformable ring gasket in said chamber, said nut at its outer end being spaced from the tube and having the inner face thereof tapered, a sleeve disposed within the nut and free to move therein and projecting outwardly beyond the end thereof, said sleeve having the inner end thereof slotted longitudinally and having serrations on the inner face of the members between the slots, said members being disposed so that when a tube is inserted in the coupling said serrations will frictionally grip the tube, said sleeve having means on the outer face thereof adapted to engage the tapered face of the nut so that an outward pull on the tube will cause the serrations on the sleeve to grip the tube and prevent the removal of the tube from the coupling, and means within the nut for expanding the sleeve and releasing the tube when said sleeve is forced inwardly so as to release the coupling from the tube.

2. A coupling for tubes comprising a body member having a bore to receive the tube end, a nut directly connected to said body member, said body member having a counter-bore forming with the tube an annular chamber for a gasket, a deformable ring gasket in said chamber, said nut at its outer end being spaced from the tube, a sleeve disposed in the nut and free to move endwise therein and projecting outwardly beyond the end thereof, said sleeve having serrations on its inner face initially in engagement with said tube, said nut and sleeve having their adjacent faces shaped so that an outward pull on the tube will cause the serration on the sleeve to grip the tube and prevent the removal of the tube from the coupling, and means within the coupling for disengaging the sleeve from the tube when the sleeve is forced inwardly so as to release the coupling from the tube.

3. A coupling for tubes comprising a body member having a bore to receive the tube end, a nut directly connected to said body member, said body member having a counter-bore forming with the tube an annular chamber for a gasket, a deformable ring gasket in said chamber, said nut at its outer end being spaced from the tube and having the inner face thereof tapered, a sleeve disposed within the nut and free to move endwise therein and projecting outwardly beyond the end thereof, said sleeve having the inner end thereof slotted longitudinally and having serrations on the inner face of the members between the slots, said members being disposed so that when a tube is inserted in the coupling said serrations will frictionally grip the tube, said sleeve having means on the outer face thereof adapted to engage the tapered face of the nut so that an outward pull on the tube will cause the serrations on the sleeve to grip the tube and prevent the removal of the tube from the coupling, and means within the coupling for disengaging the sleeve from the tube when the sleeve is forced inwardly so as to release the coupling from the tube.

4. A coupling for tubes comprising a body member having a bore to receive the tube end, a nut directly connected to said body member, said body member having a counter-bore forming with the tube an annular chamber for a gasket, a deformable ring gasket in the chamber dimensioned so as to make contact with the body member and the tube by the expansion inherent in the gasket, said nut at its outer end being spaced from the tube, a sleeve disposed in the nut and free to move endwise therein and projecting outwardly beyond the end thereof, a camming ring disposed in the nut between the sleeve and the ring gasket, said sleeve having serrations on its inner face initially in engagement with the tube, said nut and sleeve having their adjacent faces shaped so that an outward pull on the tube will cause the serrations on the sleeve to grip the tube and prevent removal of the tube from the coupling, said camming ring and the end of the sleeve being constructed so that an inward movement of the sleeve will cause said sleeve to contact with the camming ring and be expanded so as to release the grip of the sleeve on the tube.

5. A coupling for tubes comprising a body member having a bore to receive the tube ends, a nut directly connected to said body member, said body member having a counterbore forming with the tube an annular chamber for a gasket, a deformable gasket within said chamber and adapted to make initial sealing contact with said tube and said body and adapted to be deformed into tighter sealing contact with said tube and said body solely by the action of fluid pressure within the coupling, a sleeve disposed within the nut and having spring fingers initially pressing against said tube, said nut and sleeve having their adjacent faces shaped so that an outward pull on the tube will cause said fingers to grip the tube more tightly to prevent the removal of the tube from the coupling.

6. A coupling for tubes comprising a body member having a bore to receive the tube ends, a nut directly connected to said body member, said body member having a counterbore forming with the tube an annular chamber for a gasket, a deformable gasket within said chamber and adapted to make initial sealing contact with said tube and said body and adapted to be deformed into tighter sealing contact with said tube and said body solely by the action of fluid pressure within the coupling, a sleeve disposed within the nut and having spring fingers initially pressing against said tube, said nut and sleeve having their adjacent faces shaped so that an outward pull on the tube will cause said fingers to grip the tube more tightly to prevent the removal of the tube from the coupling, said sleeve projecting beyond the end of the nut, and means within the coupling for disengaging the sleeve from the tube when the sleeve is forced inwardly so as to release the coupling from the tube

ARTHUR L. PARKER.

REFERENCES CITED

The following references are of record in the file of this patent:

UNITED STATES PATENTS

| Number | Name | Date |
|---|---|---|
| 1,827,249 | McCoy | Oct. 31, 1931 |

FOREIGN PATENTS

| Number | Country | Date |
|---|---|---|
| 35,956 | France | Dec. 24, 1929 |